United States Patent [19]
Jacquemet

[11] 4,215,297
[45] Jul. 29, 1980

[54] ELECTROMAGNETIC PERCUSSION APPLIANCE

[76] Inventor: Georges Jacquemet, 9, Chemin du Vallon, Caluire (Rhone), France

[21] Appl. No.: 810,757

[22] Filed: Jun. 28, 1977

[30] Foreign Application Priority Data

Jun. 28, 1976 [FR] France ............................... 76 20184

[51] Int. Cl.$^2$ ............................................ H02K 33/00

[52] U.S. Cl. ..................................... 318/130; 310/30; 318/114; 318/132

[58] Field of Search ........................ 310/16, 17, 30, 14; 318/130, 128, 122, 125, 114, 132, 118; 307/106-108

[56] References Cited

U.S. PATENT DOCUMENTS

| | | | |
|---|---|---|---|
| 773,120 | 10/1904 | Christmas | 310/16 X |
| 1,431,808 | 10/1922 | Jackson | 310/30 |
| 1,583,583 | 5/1926 | Dominguez | 310/30 |
| 1,723,607 | 8/1929 | Dominguez | 310/16 X |
| 1,753,454 | 4/1930 | Weyandt | 310/30 |
| 3,147,419 | 9/1964 | Cope | 318/129 |
| 3,345,546 | 10/1967 | Beltramo | 310/30 X |
| 3,377,541 | 4/1968 | Farkas | 307/108 X |
| 3,400,316 | 9/1968 | Kuschel | 318/132 X |
| 3,681,629 | 8/1972 | Drye | 310/30 X |
| 3,766,455 | 10/1973 | Zakrewsky | 310/30 X |
| 3,971,969 | 7/1976 | Wines et al. | 310/30 X |
| 4,069,444 | 1/1978 | Heim | 318/118 X |

FOREIGN PATENT DOCUMENTS

| | | |
|---|---|---|
| 2309514 | 11/1973 | Fed. Rep. of Germany . |
| 2062069 | 6/1971 | France . |
| 315674 | 10/1956 | Switzerland . |

*Primary Examiner*—Donovan F. Duggan
*Attorney, Agent, or Firm*—Karl F. Ross

[57] ABSTRACT

An electromagnetic hammer has a coil coacting with an axially reciprocable armature including a ferromagnetic core traversed by an elongate nonmagnetic ram which carries at one end a spring-loaded piston head forming part of a pneumatic damping device, its other end cooperating with a working tool. The coil is intermittently energizable by a control system including a capacitor chargeable from an electric power supply by way of a first thyristor and dischargeable through the coil by way of a second thyristor, the two thyristors being sequentially triggered in response to a control pulse applied to a transformer with two secondaries generating staggered firing pulses with the aid of a delay network in the output circuit of one of these secondaries.

8 Claims, 4 Drawing Figures

ELECTROMAGNETIC PERCUSSION APPLIANCE

FIELD OF THE INVENTION

My present invention relates to an eletromagnetic percussion appliance directly transforming the electrical energy supplied to it into mechanical energy which can be utilized in the form of a blow.

BACKGROUND OF THE INVENTION

In a general manner this device is of interest to industries or in activities where it is necessary to make use of individual or repeated blows.

Percussion appliances of this kind are already known and are called electromagnetic hammers. At present they are generally restricted to low powers and comprise a movable assembly suitable to be set into to-and-fro motion by the action of impulsive forces arising from an electromagnetic field.

In its usual form of construction the motor device of such a hammer comprises a fixed electromagnet whose coil is intermittently energized to attract a core which forms part of a movable assembly comprising a percussion or ram tool.

To create the transient magnetic field, the coil of the eletromagnet must be supplied with electric current pulses of short duration, corresponding to an expenditure of energy which, converted into power, may attain a very high value.

If the coil were directly connected to a source of energy, the latter would not always be capable of supplying the instantaneous power required; in the case where that source is a utility mains, disturbances could occur in the supply network.

To obtain steady operation it is also necessary that the pulses of electric energy should be of constant value and duration.

OBJECT OF THE INVENTION

The object of my invention is to provide a system which stores energy during relatively long periods and is capable of releasing it suddenly, with the aim of obtaining blows of constant energy, recurring at a selectively variable frequency, with good energy efficiency particularly in operations that require considerable power.

SUMMARY OF THE INVENTION

For this purpose I provide, in energization-controlling circuitry according to the invention, capacitive means adapted to store the electrical energy and to release it suddenly into the coil of the electromagnet. The charging of the capacitive means is controlled by a first thyristor; the discharge thereof, creating a short-period pulse of electric current in the coil, is controlled by a second thyristor, the firing electrodes or gates of the charge and discharge thyristors being connected to respective coupling circuits feeding them with staggered firing pulses in response to a control pulse.

The capacitors here used have the advantage of being able to store energy during a desired period of time and are capable of releasing that energy practically instantaneously. As the charging of the capacitors takes place over a period of time that is very much longer than that of the discharge into the coil to create the magnetic field, the source of electrical energy is not subjected to a large overload.

In order that the fixing pulses supplied by the capacitors may be constant, it is necessary to interrupt the charging circuit before the discharge takes place, and vice versa. It is for this purpose that thyristors are used, which are well-known solid-state semiconductors triggerable into conduction by the application of an electrical signal to their gates, the return to the blocked state taking place by the reduction of the current flow through the thyristor to below a value called the holding threshold. The initiation of firing of the thyristor taking place in a very short time, of the order of a few microseconds, it suffices to apply a pulse of suitable duration and magnitude to the gate to make the thyristor conductive. The return to the blocked state of the thyristors takes place.

on charging, when the capacitors have reached their charged state on discharging, when the voltage across the capacitor terminals falls to zero.

In a particularly useful embodiment the circuitry supplying the firing pulses to the two thyristors includes an electronic source of control pulses working into an input transformer with two secondary windings which respond at different times to an applied control pulse, one of these secondaries firing the discharge thyristor whereas the other fires the charge thyristor, the delay between the two firing pulses corresponding to the discharge time of the capacitors through the coil of the electromagnet.

Thus, a single control pulse initiates the whole sequence comprising first the discharge of the capacitors and then their recharge.

Pursuant to a more particular feature of my invention, the delay means included in one of the coupling circuits—preferably the one feeding the charge thyristor—comprises an ancillary pulse generator triggerable by a control pulse to produce a firing pulse. The ancillary pulse generator may include a monostable multivibrator, or monoflop, which in an off-normal condition enables the charging of a condenser forming part of a time-constant network. When the condenser charge reaches a predetermined level, an electronic switch conducts to pass current to the associated thyristor gate.

BRIEF DESCRIPTION OF THE DRAWING

The above and other features of my invention will now be described in detail with reference to the accompanying drawing in which.

SPECIFIC DESCRIPTION

Figure 1:
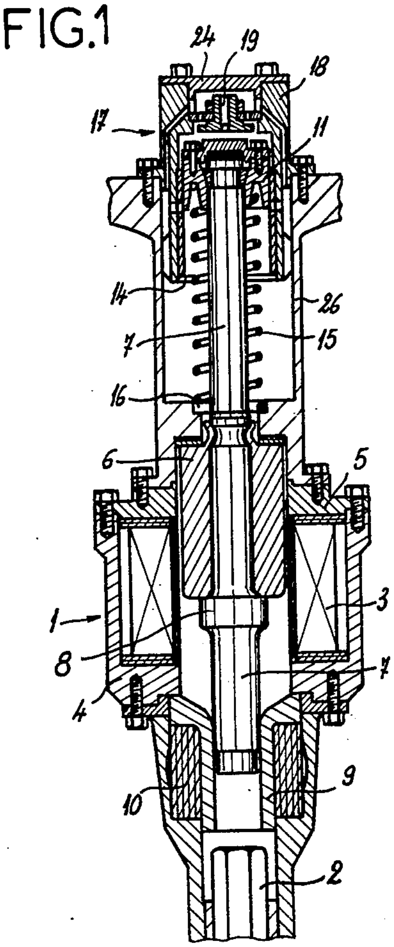
FIG. 1 represents an electromagnetic hammer seen in longitudinal section.

As FIG. 1 shows, the electromagnetic hammer here considered by way of example essentially comprises an electromagnet 1 with a ferromagnetic armature 6 in the form of a hollow plunger core situated in its reciprocable along the axis of coil 3 to transform electrical energy into mechanical energy and to strike a working tool 2.

The coil 3 designed to create the magnetic field, is surrounded by a housing of ferromagnetic metal, divided into two parts 4 and 5, which constitutes the fixed magnetic circuit.

A ram 7 axially traverses the plunger core 6 and moves with the latter under the force of attraction of the magnetic field; the speed acquired by this movable assembly during the period of attraction produces, in conjunction with the moving mass, a kinetic energy which is converted into a force at the instant of the blow on the working tool 2.

The plunger core 6 is secured around the percussion tool or ram 7 by any process, for example by crimping as is shown in the drawing; it rests on a small collar 8 of ram 7 in such a way that the pressure exerted by plunger core 6 on the ram at the instant of magnetic attraction acts upon this small collar which is dimensioned so as to be able to withstand the mechanical forces produced during operation.

The ram 7, being made of non-magnetic material capable of being cold-worked, does not undergo any magnetic attraction.

Longitudinal guidance of the movable assembly formed by plunger core 6 and ram 7 is provided by a sleeve 9 engaging the lower end of the ram. In the example shown in the drawing the sleeve 9 also acts as an anvil in the case of no-load operation and is provided with a shock absorber 10 to deaden the blows in such a case.

Figure 2:
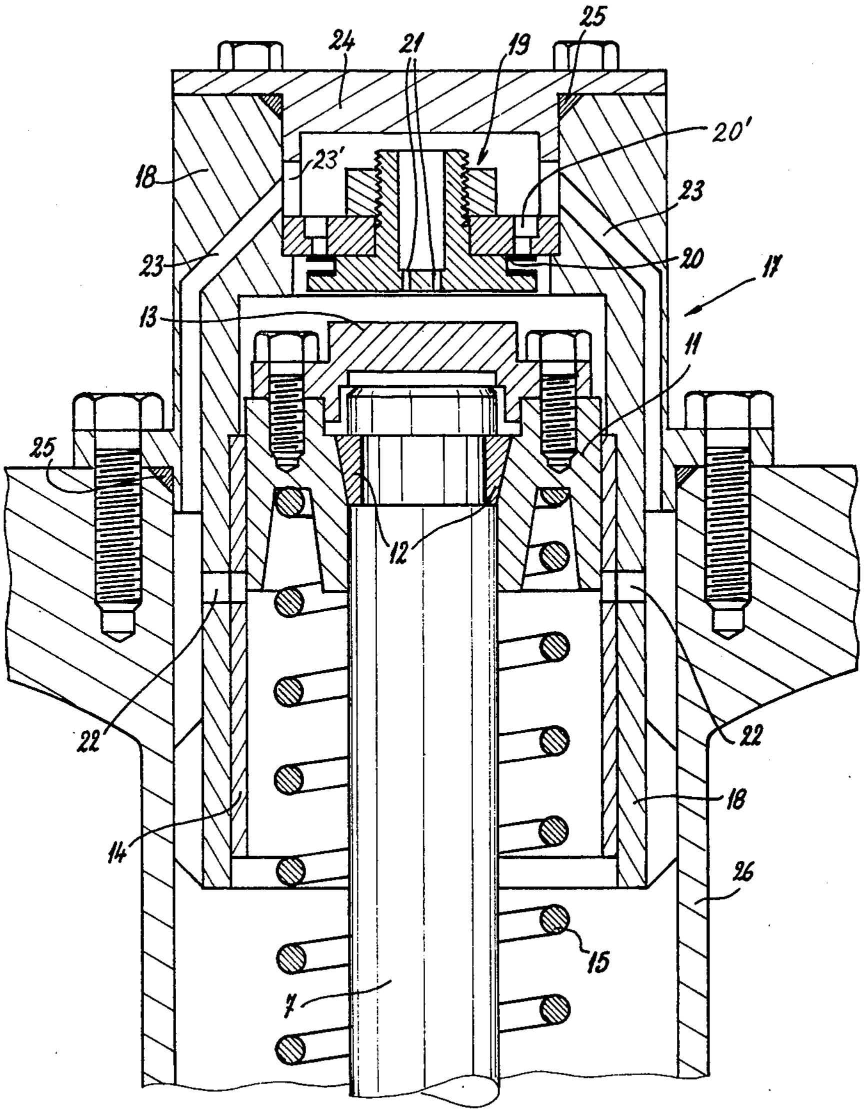
FIG. 2 shows the upper part of the hammer, seen in section and on an enlarged scale.

A piston head 11, clearly seen in FIG. 2, is arranged at the upper part of ram 7 and held in position thereon by a two-part conical cotter 12 and by retaining plate 13 which, supported on the end of ram 7, is attached to head 11 by means of bolts in the example shown. This position head slides inside a guiding sleeve 14 made of material having a low coefficient of friction even without lubrication.

Head 11 also serves to support one end of a compression spring 15 which normally maintains the movable assembly in its elevated rest position and ensures that it returns to that position after every blow when the hammer is in operation. The other end of spring 15 is supported by a fixed internal bolster 16 carried by a surrounding casing 26.

A pneumatic damping device 17, provided in the upper portion of the casing to absorb the kinetic energy acquired by the movable assembly during its return stroke under the action of spring 15, is shown in FIG. 2 on an enlarged scale.

This pneumatic damping device 17 coacts with piston head 11 whose guiding sleeve 14 is mounted inside a cylinder 18 rigid with casing 26. A valve 19 is fitted at the end of this cylinder, allowing air to be admitted into the cylinder with minimum loss of pressure by depressing a flap 20 normally obstructing a set of ports 20'; the escape of air from cylinder 18 in the course of the return stroke is limited by one or more calibrated orifices 21 drilled through the body of valve 19.

Other orifices 22 drilled through cylinder 18 and guiding sleeve 14 at suitably selected positions allows the damping effect to be limited during part of the return stroke.

The escape orifices 21 may be omitted, in which case the air contained within the cylinder acts as an elastic system cushion whose expanding force is added to the force of attraction of the magnetic field; it is then necessary that the frequency of operation of the hammer should agree with the natural frequency of this pneumatic device.

The circulation of air between the two faces of the piston head 11 takes place in a closed circuit through channels 23 provided in the wall of cylinder 18.

The valve 19 is fixed into cylinder 18 by means of a component lid 24 which also comprises orifices 23', at the outlets of channels 23, allowing circulation of air.

In order that the air circulation within the pneumatic damping device 17 may take place under the most favorable conditions, pressure-tightness is ensured by suitably disposed gaskets 25 preventing access of dust and other matter which could impair the effective working of the device. Such gaskets 25 are inserted between lid 24 and cylinder 18 as well as between cylinder 18 and the casing 26 which provides a mechanical connection between the coil housing 5 and cylinder 18. The casing 26 may consist of any kind of material e.g., steel or a light alloy.

Although the structure so far described is given merely by way of example, I wish to point out that it is designed in such a way as to yield a maximum output; in particular, the elongate shape of the ram 7 as shown is conductive to good performance. In fact, in many cases the power of the blow is a function of the duration of the shock wave which is in turn a direct function of the length of the percussive component.

Figure 3:
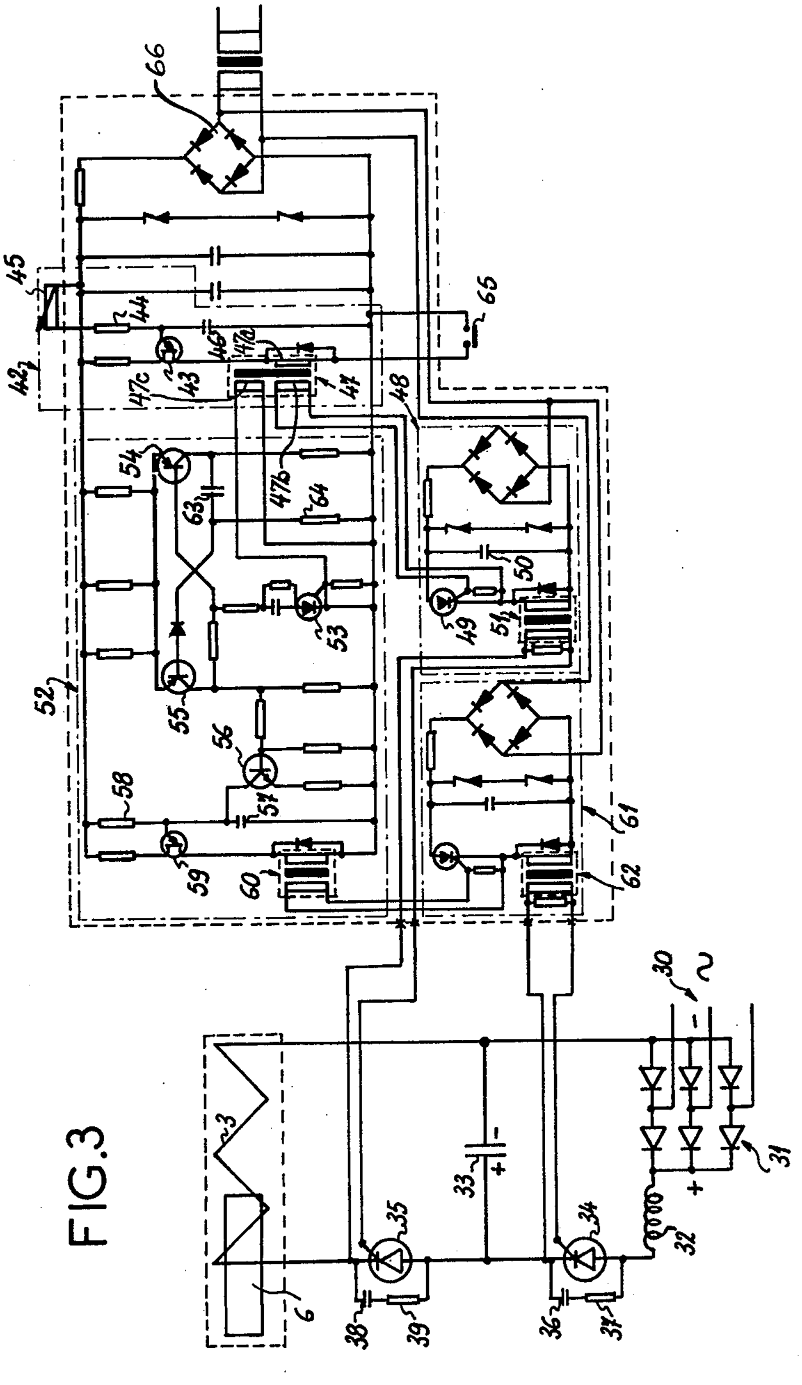
FIG. 3 is a diagram of the electrical supply and control circuits of this hammer.

FIG. 3 represents the electric circuits for power supply and control of the above-described hammer.

The power circuits which can be seen on the left-hand side of the diagram comprise a three-phase alternating-current supply line 30 and an assembly of diodes connected as a bridge rectifier 31, forming a direct-current source. An inductance 32 connected to the plus pole of bridge rectifier 31 is provided in order to determine the charging time of capacitors 33, which are shown in the diagram as a single condenser, and to limit the charging current to a suitable value. Inductance 32 is connected to the anode of a charge-control thyristor 34 whose cathode is tied to one of the terminals of condenser 33, the other terminal of this condenser being connected to the minus pole of bridge rectifier 31 included in a charging circuit.

A discharge-control thyristor 35 is connected between one of the terminals of condenser 33 and one of the ends of the hammer coil 3 whose opposite end is connected to the other terminal of condenser 33 as part of a discharge circuit. Thus, the two thyristors lie in series with each other and with coil 3 in a loop containing the power supply 30–32.

Thyristors 34 and 35 are protected against accidental excess voltages by conventional devices shown in FIG. 3 to comprise a bypass condenser 36 in series with a resistance 37 for the charge thyristor 34 and a bypass condenser 38 in series with a resistance 39 for the discharge thyristor 35.

Figure 4:
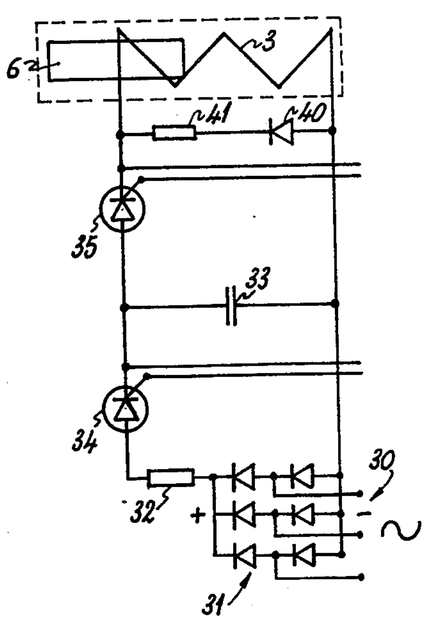
FIG. 4 is a partial electric circuit diagram illustrating a modification of the system of FIG. 3.

Alternatively, such protection can be achieved as shown in FIG. 4 by a diode 40, suitably biased, connected in series with a resistance 41 across the coil 3.

Control of thyristors 34 and 35 is obtained by electronic circuits supplying electrical pulses to the gate of each of them at requisite times in response to a single control signal which can be repeated as required.

These circuits are shown on the right-hand side of FIG. 3 but have been omitted in FIG. 4. They essentially comprise a pulse source 42 supplying either individual pulses, as required for blow-by-blow operation, or a succession of pulses at fixed or adjustable recurrence frequencies.

In the circuit diagram given by way of example, source 42 is an oscillator a unijunction transistor 43 which supplies pulses of short comprising duration whose frequency is determined by the respective values of a resistance 44, a potentiometer 45 and a condenser 46. Oscillator 42 receives power through a rectifier 66.

Upon closure of a manual switch 65, each control pulse energizes the primary 47*a* of an input transformer 47 which possesses two secondary windings 47*b*, 47*c* to ensure the correlation between the firing commands for the two thyristors 34 and 35.

Winding 47*b* immediately passes the control pulse to an amplifier stage 48.

This amplifier stage is part of a coupling circuit comprising a low-power thyristor 49, whose gate receives the pulse provided by the secondary 47*b* and which, upon conducting, discharges a condenser 50 into the primary of an output transformer 51 to produce a pulse which, passed from the secondary of this transformer 51 to the gate of discharge thyristor 35, actuates the latter.

Winding 47*c* controls the operation of a delay device 52 which delivers an electrical pulse after a precise time interval corresponding to the discharge. Of condenser 33 through the hammer coil 3, this pulse serving to fire the charge thyristor 34.

In the circuit diagram given by way of example, the delay device 52 is designed and operates in the following manner:

The electrical pulse supplied from the secondary 47*c* energizes the gate of a low-power thyristor 53 which by becoming conductive triggers a monoflop consisting of two transistors 54 and 55, thus blocking another transistor 56 and allowing a condenser 57 to charge through a resistance 58. After a time determined by the time constant network 57, 58 this device supplies, by way of a unijunction transistor 59, a pulse which is received by the primary of a transformer 60.

From the secondary of transformer 60 this pulse reaches an amplifier stage 61, similar to amplifier stage 48, whose output transformer of 62 controls the operation of charge thyristor 34.

The monoflop 54, 55 returns to its stand-by position after a period determined by a condenser 63 and a resistance 64. Transistor 56 thus becomes conductive and the voltage across the terminals of condenser 57 falls to zero.

As will be apparent from the foregoing description and the drawing, the feeding of a firing pulse from transformer 51 to the gate of thyristor 35 turns this transistor on if, and only if, storage capacitor 33 has retained a previous charge. The subsequent transmission of a firing pulse from transformer 62 to the gate of thyristor 34 unblocks the latter until the voltage difference across the storage capacitor substantially equals the supply voltage. Obviously, the full capacitor charge will be available for energization of coil 3 only if the pulses generated by oscillator 42 are sufficiently separated. The reciprocation of the ram terminates upon the reopening of switch 65.

The system can be operated at different frequencies and with constant energy. The delay period of device 52 is obviously independent of the operating frequency of oscillator 42.

The power supply to the electromagnetic hammer can deliver alternating current as in the example considered, in which case the use of rectifiers is necessary, or as direct current. The force of the blow can be modified, if desired, by varying the supply voltage.

I claim:

1. In a percussion instrument provided with a reciprocable ram coupled with an armature of an electromagnetic coil and a circuit arrangement for intermittently energizing said coil from a current supply to displace said ram unidirectionally against the force of a restoring spring, the improvement wherein said circuit arrangement comprises:

capacitive means for storing electrical energy, said capacitive means being provided with a charging circuit including said current supply and a discharging circuit including said coil;

a first thyristor in said charging circuit provided with a first gate;

a second thyristor in said discharging circuit provided with a second gate;

a source of control pulses; and circuitry connected between said source and said thyristors for converting each of said control pulses into first and second firing pulses respectively fed at different instants to said first and second gates for charging and discharging said capacitive means, said circuitry including a first coupling circuit connected to said first gate, a second coupling circuit connected to said second gate and delay means in one of said coupling circuits for relatively staggering said first and second firing pulses by a time interval independent of the recurrence rate of said control pulses.

2. The improvement defined in claim 1 wherein said delay means is included in said second coupling circuit, the firing pulse fed to said first gate following the firing pulse fed to said second gate after an interval sufficient for a full discharge of said capacitive means through said coil.

3. The improvement defined in claim 1 wherein said delay means comprises an ancillary pulse generator triggerable by each of said control pulses to produce a firing pulse.

4. The improvement defined in claim 3 wherein said ancillary pulse generator comprises a monoflop, a time-constant network including a condenser chargeable in an off-normal condition of said monoflop, and an electronic switch coupled to said network for conducting upon the attainment of a predetermined charge by said condenser.

5. The improvement defined in claim 1 wherein each of said coupling circuits includes amplifier means and an output transformer inserted between said amplifier means and the respective thyristor.

6. The improvement defined in claim 1 wherein said source comprises an oscillator of adjustable frequency.

7. The improvement defined in claim 1 wherein said circuitry further comprises input transformer means with primary winding means connected across said source and with two secondary windings respectively connected to said first and second coupling circuits.

8. The improvement defined in claim 7, further comprising an operating switch in series with said primary winding means.

* * * * *